United States Patent [19]

Tigner et al.

[11] 3,975,493
[45] Aug. 17, 1976

[54] METHOD FOR FORMING HOLLOW ARTICLES FROM THERMOPLASTIC SHEETING OR FILM USING AN EXPANDABLE PLUG

[75] Inventors: Reuben A. Tigner, Bay City; Lewis S. Mounts, Midland, both of Mich.

[73] Assignee: The Dow Chemical Company, Midland, Mich.

[22] Filed: Jan. 27, 1975

[21] Appl. No.: 544,466

Related U.S. Application Data

[62] Division of Ser. No. 421,005, Dec. 3, 1973, Pat. No. 3,901,640.

[52] U.S. Cl. .............................. 264/292; 264/89; 264/92; 264/94; 264/313; 264/314
[51] Int. Cl.² ................ B29C 1/12; B29C 17/04; B29C 17/06
[58] Field of Search ............... 264/89, 90, 92, 93, 264/94, 97, 292, 313, 314, 315; 425/388, 389, 387 R

[56] References Cited
UNITED STATES PATENTS

| | | | |
|---|---|---|---|
| 2,937,403 | 5/1960 | Keith | 264/313 X |
| 3,184,524 | 5/1965 | Whiteford | 264/314 X |
| 3,642,415 | 2/1972 | Johnson | 425/389 |

*Primary Examiner*—Jan H. Silbaugh
*Attorney, Agent, or Firm*—Arthur J. Young

[57] ABSTRACT

A method for using an expandable forming plug in forming apparatus such as plug assisted vacuum or pressure differential forming machines and the like wherein the plug cooperates with a mold to form hollow articles such as containers, closures, trays, and the like, from thermoplastic synthetic resinous film or sheeting. The expandable plug provides hollow articles which during forming can be programed or controlled, as desired, with respect to thickness distribution in the walls thereof and, more particularly, provides hollow articles with side and bottom walls of desired thickness, such as of substantially uniform or of a varying thickness.

3 Claims, 6 Drawing Figures

METHOD FOR FORMING HOLLOW ARTICLES FROM THERMOPLASTIC SHEETING OR FILM USING AN EXPANDABLE PLUG

CROSS-REFERENCE TO RELATED APPLICATION

This is a division, of application Ser. No. 421,005 filed Dec. 3, 1973, now issued as Pat. No. 3,901,640.

BACKGROUND OF THE INVENTION

1. Field of the Invention:

This invention relates to new and useful improvements for making hollow articles such as containers, closures, trays, and the like, from thermoplastic synthetic resinous film or sheeting and, more particularly, to a method for using an expandable plug or plunger which cooperates with a forming mold in forming apparatus to provide hollow articles which during forming can be programed or controlled, as desired, with respect to thickness distribution throughout the walls thereof.

2. Description of the Prior Art:

At the present time, a variety of hollow articles are formed from thermoplastic synthetic resinous materials. They include containers, closures for containers, trays and the like which are generally formed by injection molding or mechanical drawing processes.

In a mechanical drawing process, plastic sheeting or film may be excessively stretched thereby resulting in the formation of hollow articles having an objectionable variable wall thickness, particularly in deep corner areas, or an objectionable appearance due to visible flow lines in the walls thereof. These problems are caused by the sheeting or film sticking to the forming mold thereby producing thick wall sections where the mold first contacts the sheeting or film and excessively thin wall sections in deep drawn corner areas. In extreme cases, hollow articles will have deep drawn areas with very thin wall thicknesses which reduce their marketability because of inadequate strength, impact resistance, ruggedness and/or unpleasant appearance. Furthermore, relatively thick sheeting or film may be necessary to overcome these problems, thereby producing hollow articles which cannot economically compete with similar articles formed from other structural materials such as metal.

To overcome the above problems, a plug or plunger is often used to assist in the formation of mechanically drawn hollow articles. For example, a plug or plunger is often used to push heat softened plastic sheeting or film into a female forming mold of a vacuum forming machine. While the general utilization of plugs or plungers in cooperation with forming molds may improve the formation of hollow articles, the known plug or plunger designs have not been entirely satisfactory in eradicating the material distribution problems in the walls of deep drawn hollow articles and, in some instances, have created other problems such as plug mark off and contamination of the formed articles. In this regard, the previously discussed sticking of the sheeting or film to a mold may also occur on a plug or plunger causing the formation of hollow articles with excessively thick bottom walls and thinned out deep corner areas.

Of the known types of plugs or plungers, the most commonly used is a solid metal or wooden plug which is somewhat smaller than and approximately the same shape as the forming cavity in the mold. This type of plug is illustrated in U.S. Pat. No. 2,891,280. Other known plugs which attempt to improve material distribution in the walls of hollow articles by deforming during processing are disclosed in U.S. Pat. Nos. 2,966,873 and Re 24,833. Plugs with felt or fabric covers and plugs which are lubricated have also been used to improve slip of heat softened plastic sheeting or film over the plug thereby providing better wall thickness distribution in the resulting hollow articles formed therewith.

SUMMARY

In general, the present invention relates to a method for using an expandable forming plug or plunger in apparatus to produce hollow articles from thermoplastic synthetic resinous sheeting or film of substantially uniform thickness. The expandable plug is adapted for use in cooperation with forming molds of single or multiple cavity forming apparatus such as vacuum or differential pressure thermoforming machines and the like to form hollow articles such as containers, closures for containers, trays, and the like. The expandable plug provides improved hollow articles which during forming can be programed or controlled, as desired, with regard to thickness distribution in the walls thereof and, more particularly, provides thermoformed hollow articles with side and bottom walls of substantially uniform or of a controlled varied thickness. For instance, in a well-controlled process, it is possible to use an expandable plug which will produce a hollow article having a wall thickness in deep corner areas equal to or greater than that obtainable in other portions of the side or bottom walls. The expandable plug can be made from many materials including metals such as steel or aluminum, wood, plastics such as nylon, rubber and the like.

The expandable plug or plunger, adapted for use in cooperation with forming molds in apparatus for producing hollow articles from thermoplastic synthetic resinous sheeting or film, comprises a plurality of adjacent elongated segments, means for holding one end of the segments in a juxtaposed pivotal relationship with each other, means for moving the other opposing ends of the segments outwardly away from one another as the segments advance and force plastic sheeting or film into a forming mold and means for returning the other ends of the segments to their original adjacent position as the same are withdrawn from the forming mold.

The expandable plug may also include a flexible, resilient cover or sleeve positioned around the plurality of segments to reduce mark off or striation in the hollow articles being formed with the expandable plug. The cover or sleeve can be made from any flexible, resilient material, but is preferably made from a material such as silicone rubber which has good wear resistance during prolonged high temperature use. In addition, means for heating and/or cooling may also be included in the expandable plug thereby improving control of material distribution in hollow articles formed with the expandable plug.

Accordingly, an object of the present invention is to provide a method for using an expandable plug or plunger in forming apparatus to produce hollow articles from thermoplastic synthetic resinous sheeting or film.

A further object is to provide a method for using an expandable plug or plunger in forming apparatus such as vacuum and/or pressure differential forming machines to form heated thermoplastic synthetic resinous sheeting or film into hollow articles such as containers, closures for containers, trays, and the like.

A still further object is to provide a method for using an expandable plug or plunger which cooperates with forming molds in forming apparatus to produce hollow articles that, during the formation thereof, can be programed or controlled, as desired, with respect to thickness distribution in the walls thereof and, more particularly, to produce hollow articles with side and bottom walls of substantially uniform or of a controlled varied thickness.

Additional objects and advantages of the present invention are even more apparent when taken in conjunction with the accompanying specification, drawings and claims.

BRIEF DESCRIPTION OF THE DRAWINGS

The invention is further understood by reference to the accompanying drawings in which like characters of reference designate corresponding materials and parts throughout the several views thereof, in which.

DESCRIPTION OF THE PREFERRED EMBODIMENTS

The following description illustrates the manner in which the principles of the invention are applied but are not to be construed as limiting the scope of the invention.

Figure 1:
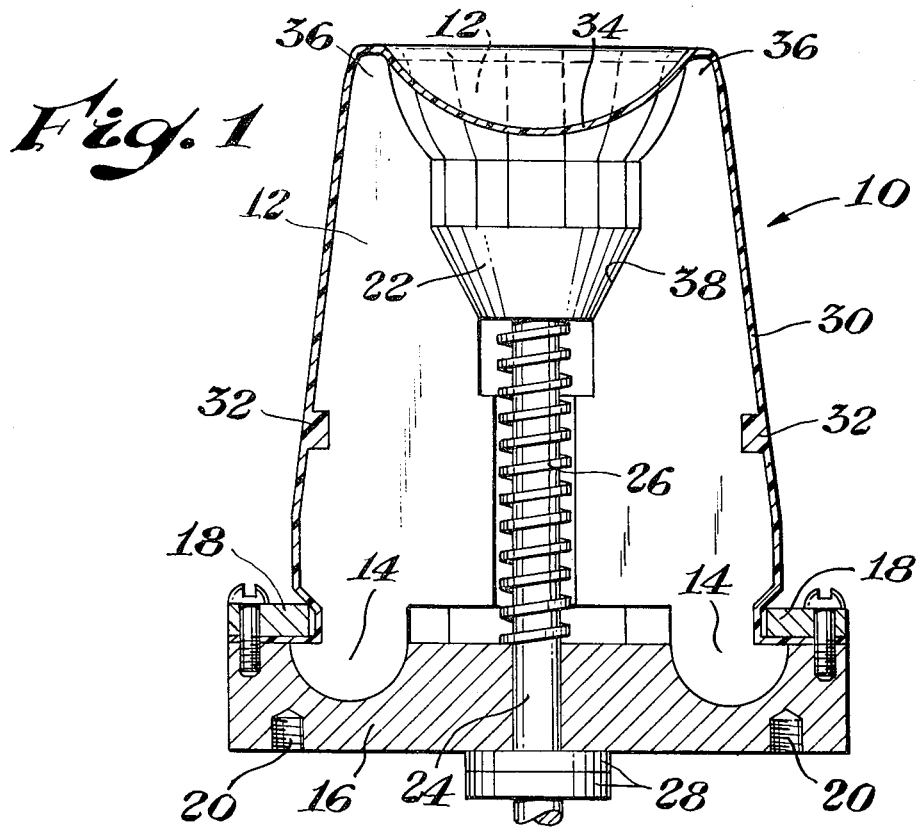
FIG. 1 is a sectional view of an expandable plug constructed according to the principles of the present invention.
Figure 2:
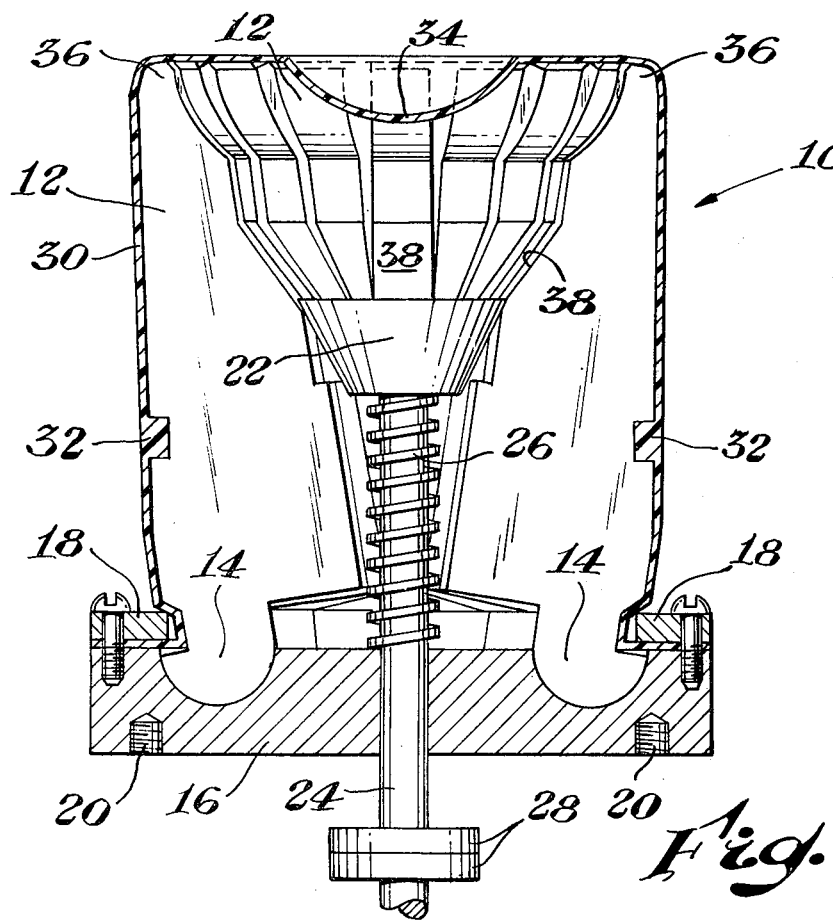
FIG. 2 is a sectional view of the expandable plug illustrated in FIG. 1 showing the plug in its expanded position.

More specifically referring to FIGS. 1 and 2, an expandable plug or plunger 10 in its unexpanded and expanded positions, respectively, is illustrated. Plug or plunger 10 is designed for forming round, straight or slanted side wall hollow articles, although plugs or plungers similar in design to plug 10 can also be constructed to produce different shapes such as oval, square or rectangular hollow articles and the like. Plug or plunger 10 is adapted for use in cooperation with female forming molds, not shown in FIGS. 1 and 2, of single or multi-cavity apparatus used to produce hollow articles from thermoplastic synthetic resinous sheeting or film. Plug 10 can be made from any desired structural material, but is preferably made from a metal such as aluminum or steel.

Expandable plug 10 comprises a plurality of closely spaced adjacent segments or fingers 12 held in juxtaposed pivotal relationship with one another at the base end 14 thereof by a base plate 16 and ring clamp 18. Base plate 16 includes fastening means 20 for attaching plug 10 into the forming station of any common forming apparatus, not shown, used to form hollow articles.

Plug 10 is positioned in a similar manner as the normal solid plug used in such forming apparatus. Plug 10 also includes a cam 22, rod 24, spring 26, adjustable stop nuts 28 and a flexible, resilient cover or sleeve 30 formed of silicone rubber positioned around fingers 12. Cover or sleeve 30 includes a band portion 32 for holding cover 30 in a fixed position on fingers 12 and to insure that fingers 12 are held in a juxtaposed relationship before expansion of the same. Cover or sleeve 30 also includes a concave portion 34 inside the forward ends 36 of fingers 12 to prevent plastic film or sheeting from sticking or freezing to this area during the forming operation.

During operation of forming apparatus incorporating plug 10, cam 22 interacts with camming surfaces 38 of fingers 12 to expand the forward ends 36 of fingers 12. As plug 10 is advanced, forcing heated plastic sheeting or film into a forming mold, not shown, cam 22 is activated after plug 10 has advanced a predetermined distance into the forming mold, preferably after forward ends 36 have reached at least about three quarters of the depth of the form mold. Activation of cam 22 is accomplished by a simple mechanical stop, not shown, in the forming apparatus which prevents the continued movement of rod 24 after plug 10 has advanced the desired distance into the forming mold. When plug 10 is retracted from the forming mold, spring 26, band portion 32 and stop nuts 28 cooperate to return fingers 12 to their original unexpanded juxtaposed position. Adjustable stop nuts 28 may also be used to effect a degree of variability in the original juxtaposed position of fingers 12 thereby increasing control over material distribution in hollow articles formed with plug 10.

Figure 3:
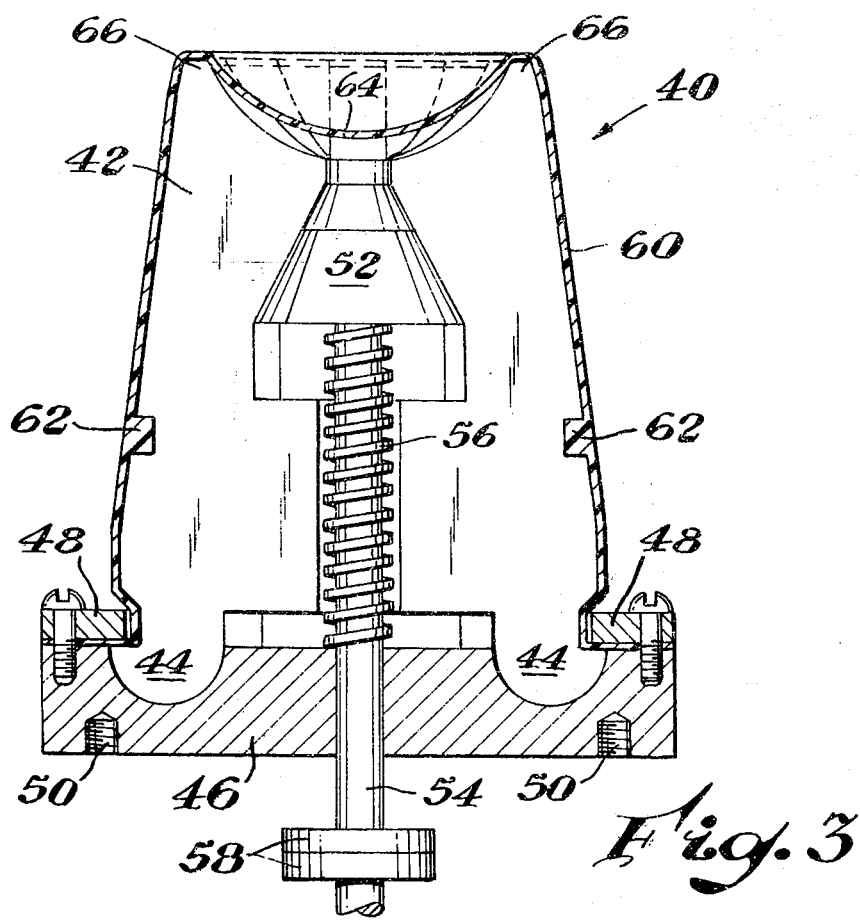
FIG. 3 is a sectional view illustrating a modified expandable plug constructed according to the principles of the present invention.

Referring now to FIG. 3, a modified expandable plug 40 is illustrated. Plug 40 comprises fingers 42 having base ends 44 and forward ends 66, base plate 46, ring clamp 48, fastening means 50, cam 52, rod 54, spring 56, adjustable stop nuts 58 and cover or sleeve 60 having a band portion 62 and concave portion 64, all of which are structurally and functionally similar to corresponding parts of plug 10 with the exception of the camming mechanism. Cam 52 must be moved forward by rod 54 to expand forward ends 66 of fingers 42. This camming mechanism is particularly suited where plug 40 is held in a fixed position in a forming apparatus and the forming mold is moved to the same during the forming operation.

It has been found that the flexible resilient covers 30 and 60 of plugs 10 and 40, though preferred to prevent mark off or striation in hollow articles as a result of plastic sheeting or film sticking to the forward ends 36 and 66 of fingers 12 and 42 and then thinning out between fingers 12 and 42 as they are expanded, are not necessary if a large number, preferably about 200 to 300, of fingers 12 and 42 are used. However, as a practical matter, flexible covers 30 and 60 are preferred because the use of a large number of fingers 12 and 42 presents difficult assembly and maintenance problems and because the elastic behavior of covers 30 and 60 positioned over fingers 12 and 42 provides excellent radial thinning and material distribution of the plastic sheeting or film at the forward points of contact with plugs 10 and 40 as the same are expanded. When an expandable plug is used without covers 30 and 60, the band portions 32 and 62 of the same can be replaced by a common flexible rubber "O" ring.

Plugs 10 and 40 may also include heating and/or cooling means, not shown, since it is known that the temperature of a plug used in forming apparatus is a significant variable for controlling material distribution in hollow articles during formation thereof. However, it has been found that the expandable plugs herein described are much less critical or sensitive with respect to temperature control thereof than are other known solid plug designs. Furthermore, the use of heating and/or cooling means to control the temperature of expandable plugs that do not include covers 30 and 60 will help prevent the mark off or striation problem previously discussed.

Figure 4:
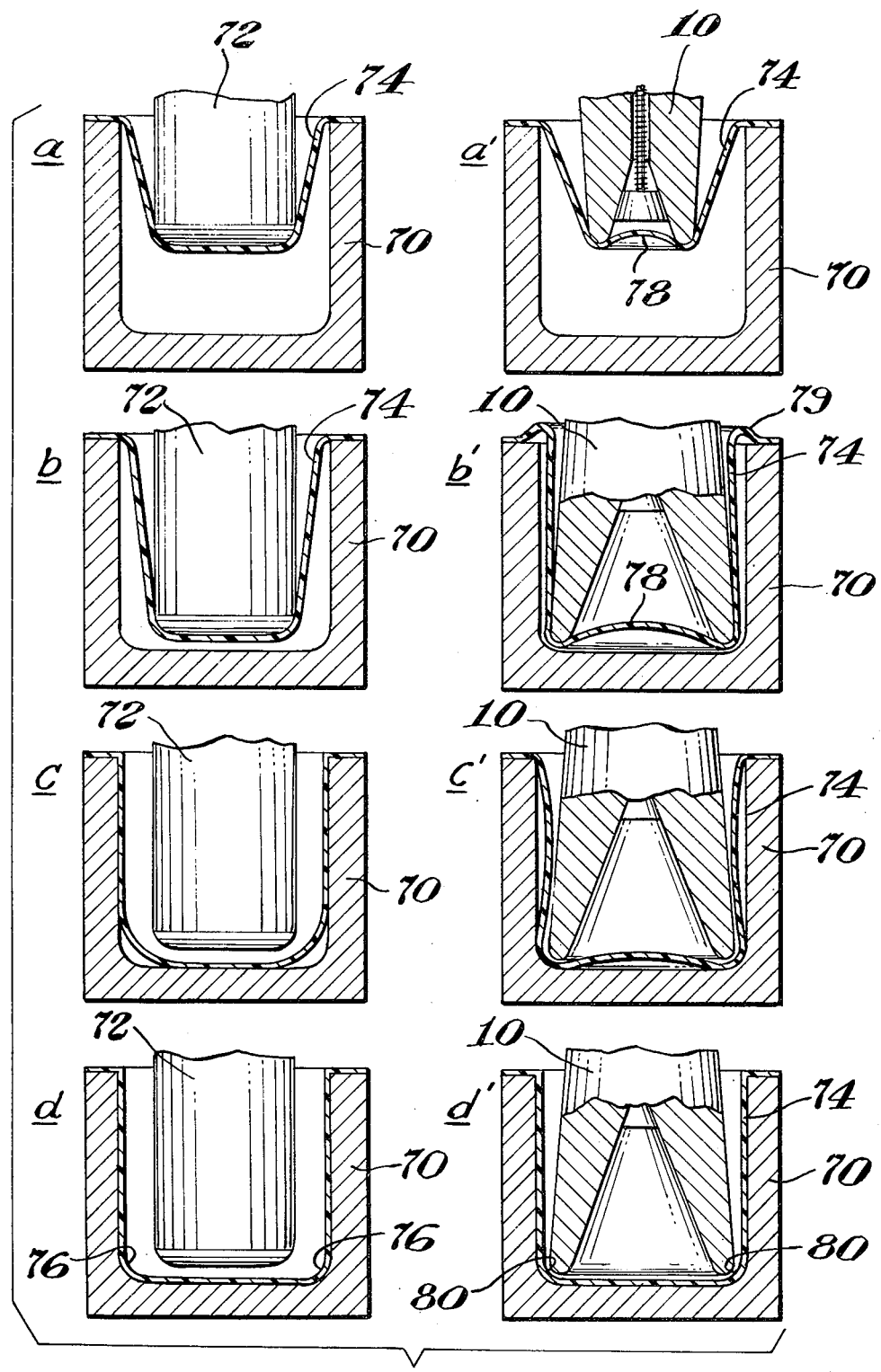
FIG. 4 is a schematic illustration of the operation of the expandable plug shown in FIGS. 1 and 2 as compared to the operation of a standard solid metal plug.

To better illustrate the comparative differences between the use of solid metal plugs and the expandable plugs, herein described, in forming apparatus such as a vacuum thermoforming machine, reference is now made to FIG. 4. Specifically, FIG. 4 schematically illustrates four steps, a–d and a'–d', respectively, in the formation of a container from heated polystyrene sheeting 74 with a solid metal plug 72 and expandable plug 10 used in cooperation with a vacuum forming mold 70. As noted in steps a and b, heated sheeting 74 sticks to bottom and lower side walls of solid plug 72 as soon as it contacts the same. This results in a thin bottom corner area 76 at step d since it is obvious from step c that there is a limited amount of sheeting 74 available to be drawn into corner area 76. When expandable plug 10 is used, it is shown in step a' and b' at points 78 and 79 that increased pressure between sheeting 74 and mold 70 occurs as a result of the expansion of plug 10 which provides better material distribution of sheeting 74. In addition, it is shown in steps b' and c' how, by use of the expandable plug of this invention, sheeting 74 from the bottom area of plug 10 is mechanically drawn into corner areas 80 resulting in better distribution of material between container bottom and corner areas 80.

Figure 5A:
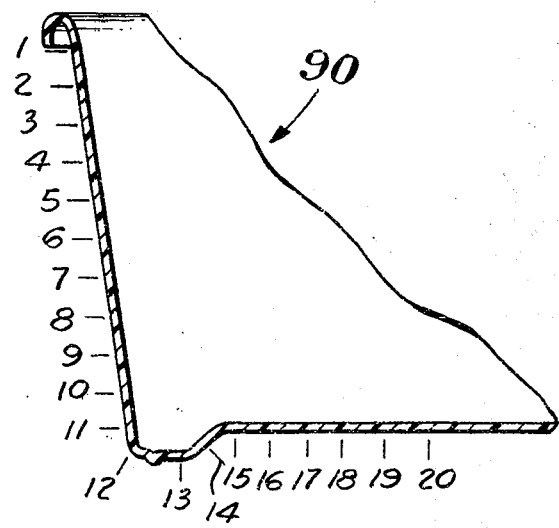
FIGS. 5A and 5B are partial sectional views of a common plastic container or tub and a graph comparing the thickness distribution in the walls of containers or tub formed with a standard solid metal plug and the expandable plug shown in FIGS. 1 and 2.
Figure 5B:
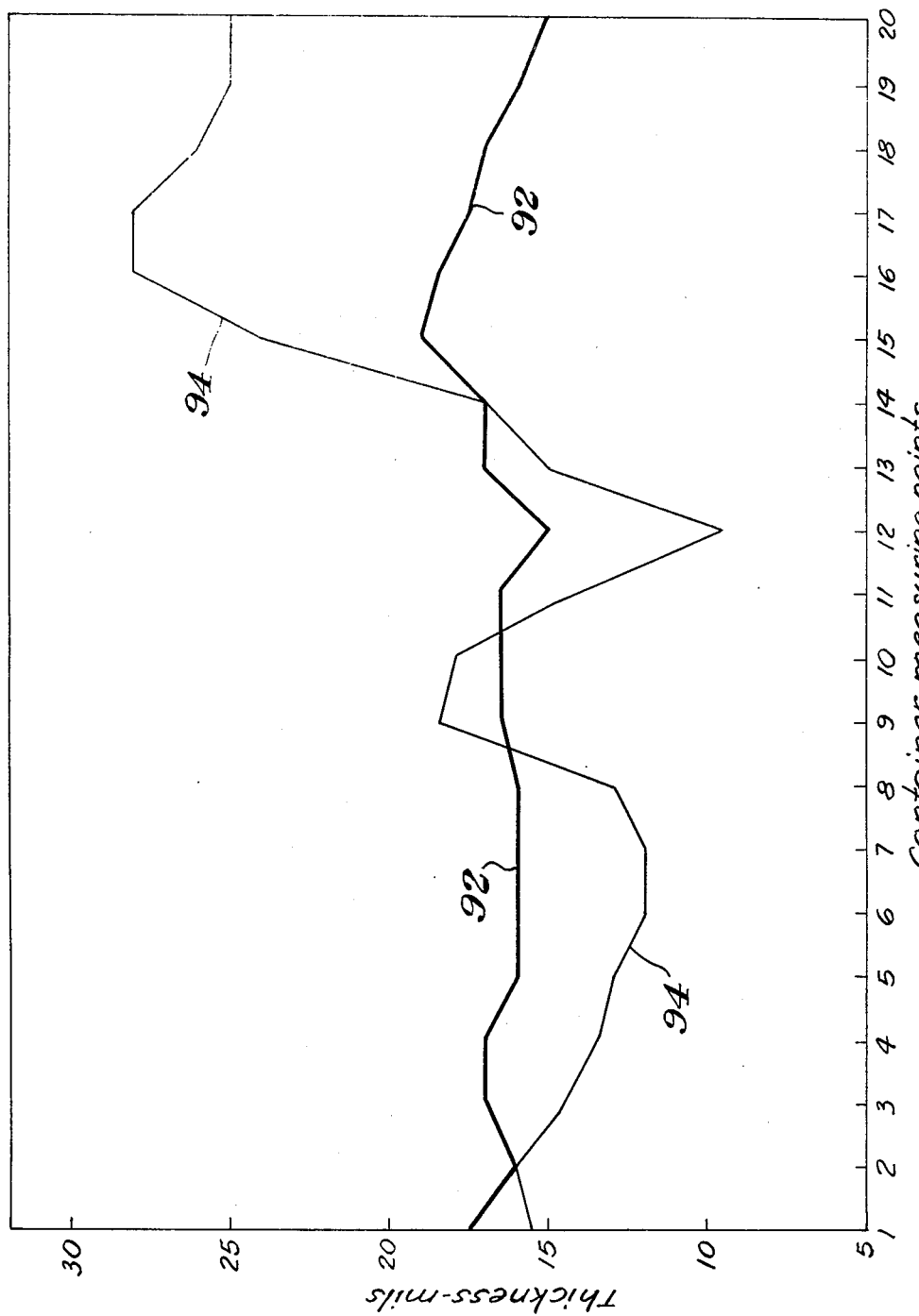

Referring to FIGS. 5A and 5B, a further illustration of a round, slanted side wall container 90, such as may be used to package dairy products, formed with a solid metal plug and an expandable plug described herein, and a graph comparing the side and bottom wall thickness distribution at various points, is shown. Containers 90 were formed on a vacuum thermoforming machine using standard forming conditions from heated polystyrene sheeting using an expandable plug like plug 10 and a common solid metal plug. The containers 90 were then cut in half and measured for thickness at points 1–20, shown in FIG. 5A. The thickness measurements were then plated on a graph, shown in FIG. 5B, with heavy line 92 representing the wall thickness distribution of container 90 formed with the expandable plug and light line 94 representing the wall thickness distribution of container 90 formed with the solid metal plug. Lines 92 and 94 clearly illustrate the typical contour and thickness distributional differences of the expandable plug and solid metal plug. Of particular interest is the difference found at point 12, the bottom outside corner of container 90. The expandable plug forms a thicker wall section at this point where the majority of severe impacts during use of container 90 can be expected. As a result, a container having an overall thinner wall thickness and lighter weight can be made with an expandable plug which will have the impact resistance of a thicker and heavier container formed with a solid metal plug. Similarly, it is possible to use an expandable plug of this invention to provide articles having variable programed wall thickness, whenever such may be desirable.

While certain representative embodiments in detail have been shown for the purpose of illustrating the invention, it will be apparent to those skilled in the art that various changes and modifications can be made without departing from the spirit and scope of the invention. For example, the scope of the present invention is not limited to an expandable plug designed to only forming round, slanted side wall hollow articles, as illustrated in FIG. 4, since an expandable plug can be designed to form straight side wall hollow articles, and oval, square or rectangular hollow articles and the like.

What is claimed is:

1. A method of forming a hollow article from thermoplastic synthetic resinous sheeting or film, comprising:
   a. providing an expandable plug and forming mold in an apparatus adapted for forming said hollow article, said expandable plug comprising a plurality of adjacent elongated pivotal segments, means for holding one end of said segments in a juxtaposed pivotal relationship with each other, means for moving the other opposing ends of said segments outwardly away from one another as said segments advance and force said sheeting or film into said forming mold, means for returning said segments to their original adjacent position as said segments are withdrawn from said forming mold and a flexible, resilient cover or sleeve positioned around said plurality of segments;
   b. forcing said sheeting or film into said forming mold with said expandable plug in its original unexpanded position;
   c. moving the forward ends of the pivotal segments of said expandable plug outwardly away from one another as said plug moves into said forming mold to draw the sheeting or film from the bottom area of the plug into corner areas of the mold and also thin the sidewall portions thereof whereby the elastic behavior of said cover or sleeve provides radial thinning and controlled material distribution of the sheeting or film upon forming said hollow article in said mold;
   d. returning said expandable plug to its original unexpanded position outside of said forming mold after said hollow article has been formed; and
   e. removing said formed hollow article from said mold.

2. The method of claim 1 wherein said expanding step is accomplished after said plug has advanced a predetermined distance into said forming mold.

3. The method of claim 2 wherein said predetermined distance is at least about three quarters of the depth of said forming mold.

* * * * *